United States Patent [19]

Baranski

[11] Patent Number: 4,860,133

[45] Date of Patent: Aug. 22, 1989

[54] CASSETTE BIN STRUCTURE INCLUDING A BIN SECTION FOR LOADING AND UNLOADING CASSETTES

[75] Inventor: Antoni S. Baranski, San Carlos, Calif.

[73] Assignee: Ampex Corporation, Redwood City, Calif.

[21] Appl. No.: 207,038

[22] Filed: Jun. 14, 1988

Related U.S. Application Data

[63] Continuation of Ser. No. 851,069, Apr. 11, 1986, abandoned.

[51] Int. Cl.[4] .................... G11B 15/68; G11B 15/00
[52] U.S. Cl. ............................ 360/92; 360/137; 360/96.5; 414/283; 414/281; 414/417
[58] Field of Search ............ 360/91, 92, 96.5, 90, 360/88, 98, 137; 369/38, 39; 414/277, 278, 279, 280, 281, 282, 283, 417

[56] References Cited

U.S. PATENT DOCUMENTS

| | | | |
|---|---|---|---|
| 3,825,949 | 7/1974 | Pyles | 360/105 X |
| 3,996,617 | 12/1976 | Cousino | 360/92 |
| 4,170,030 | 10/1979 | Castrodale et al. | 369/38 X |
| 4,287,541 | 9/1981 | Tanahashi et al. | 360/92 |
| 4,608,679 | 8/1986 | Rudy et al. | 369/39 X |
| 4,623,945 | 11/1986 | Deutsch et al. | 360/93 |

Primary Examiner—Robert S. Tupper
Assistant Examiner—Andrew L. Sniezek
Attorney, Agent, or Firm—Harry G. Thibault; Richard P. Lange

[57] ABSTRACT

A cart spot player having a tape library or bin structure, a series of tape transports in stacked alignment, and a cassette loading/unloading station as part of the bin structure; at one side of the player, input/output ports are provided for the bin structure, the tape transports and the cassette loading/unloading station for operator access; at the opposite side of the player, input/output ports are provided for the bin structure, the tape transports, and the cassette loading/unloading station for access thereto by a cassette transfer assembly moveable to access the player for the transport of a cassette from a first location to a second location remote from the first location and capable of mechanically loading the bin structure with the cassette input from the cassette loading/unloading station. Cassette sensing and cassette positioning means associated with the cassette loading/unloading station facilitate the cassette transfer process.

9 Claims, 6 Drawing Sheets

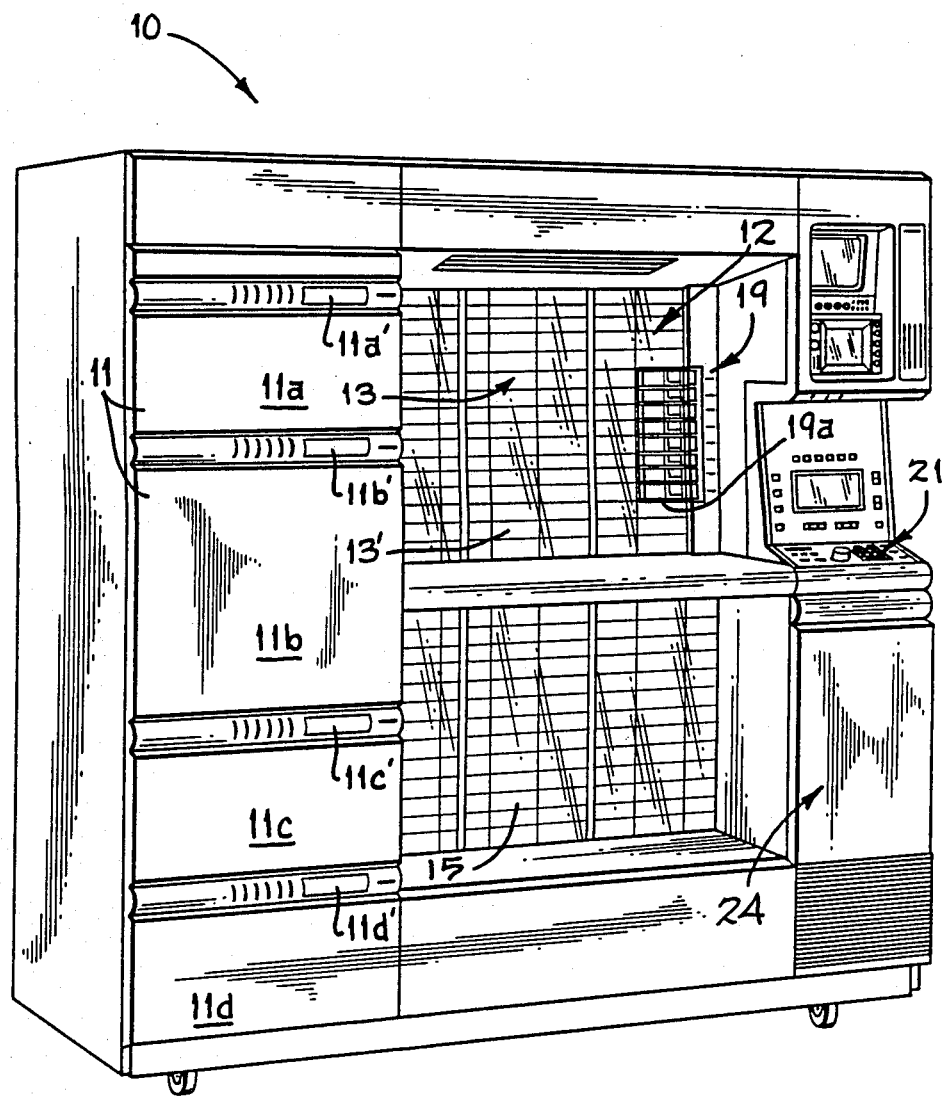
FIG_1

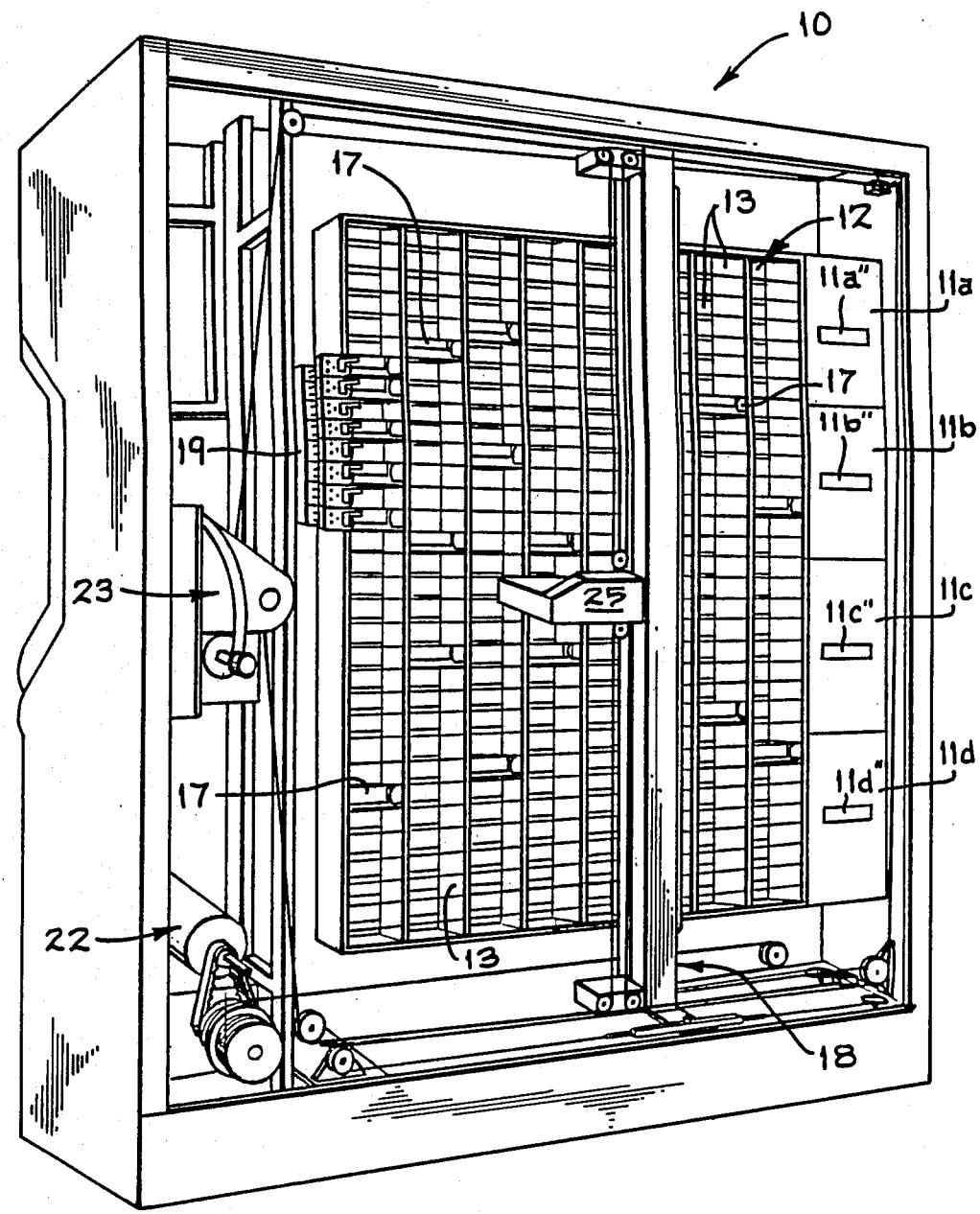
FIG_2

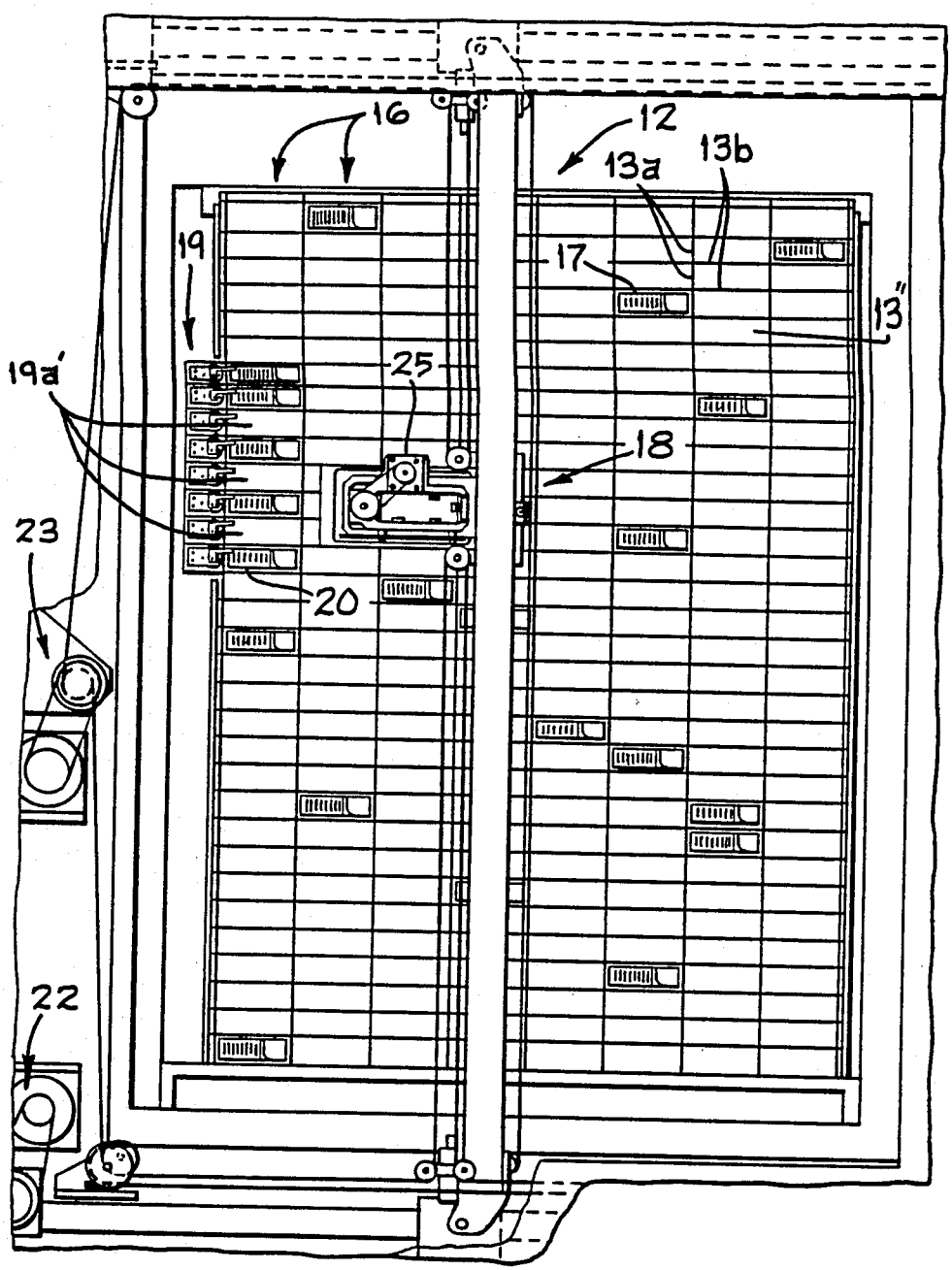
FIG_3

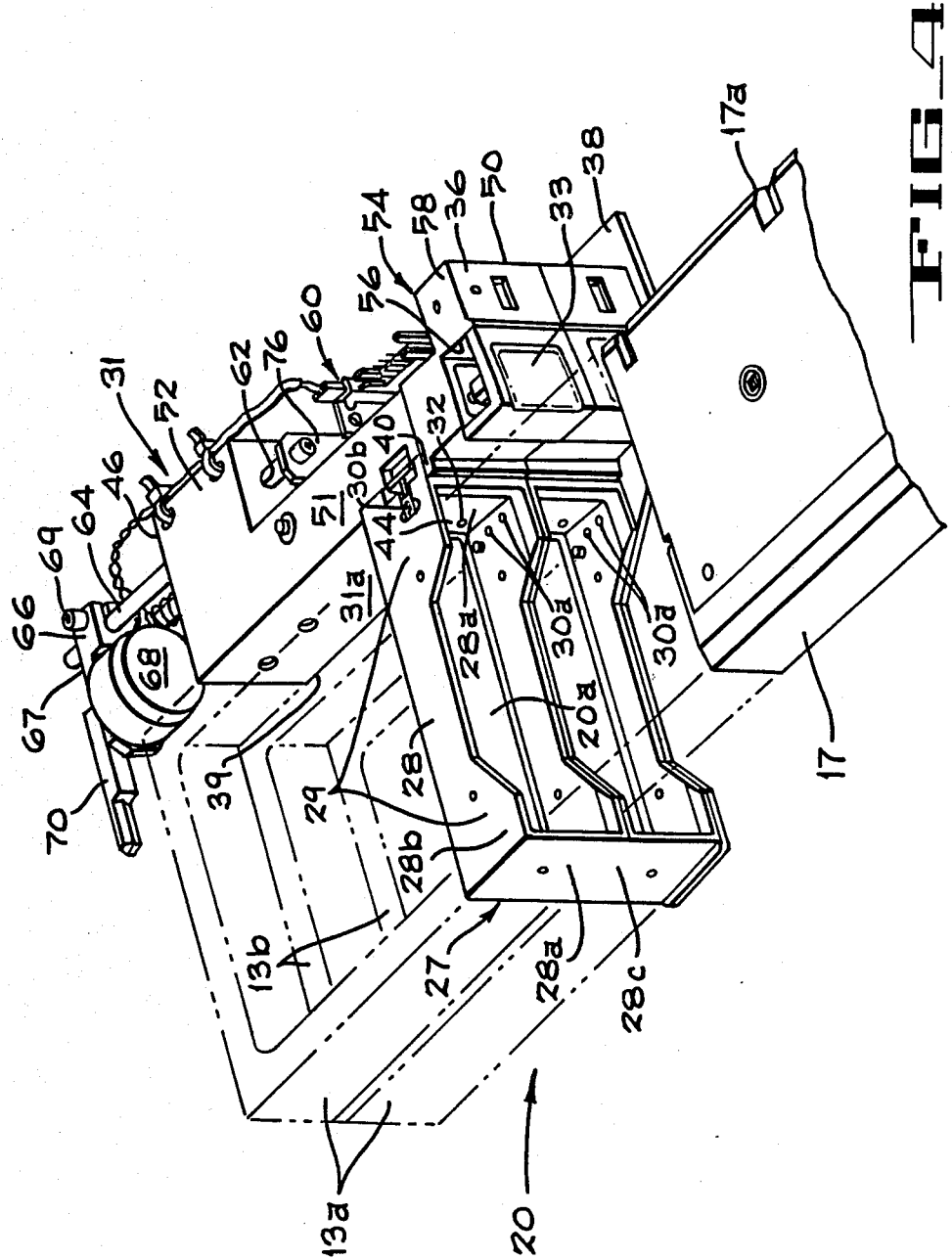

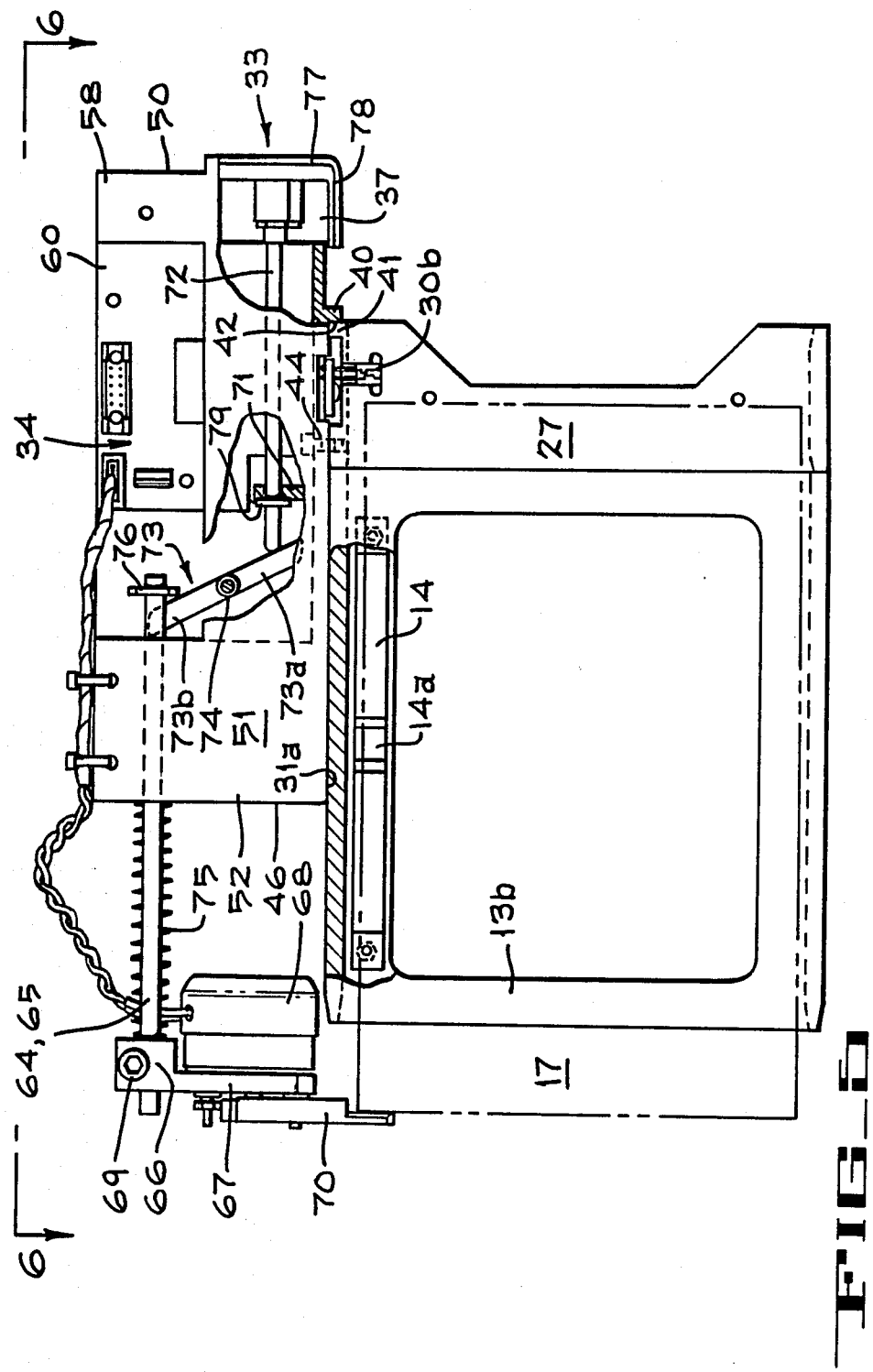
FIG_5

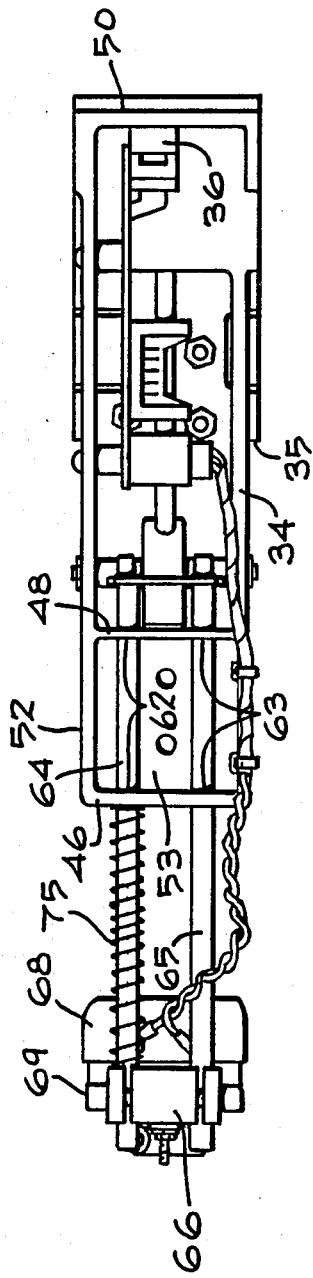
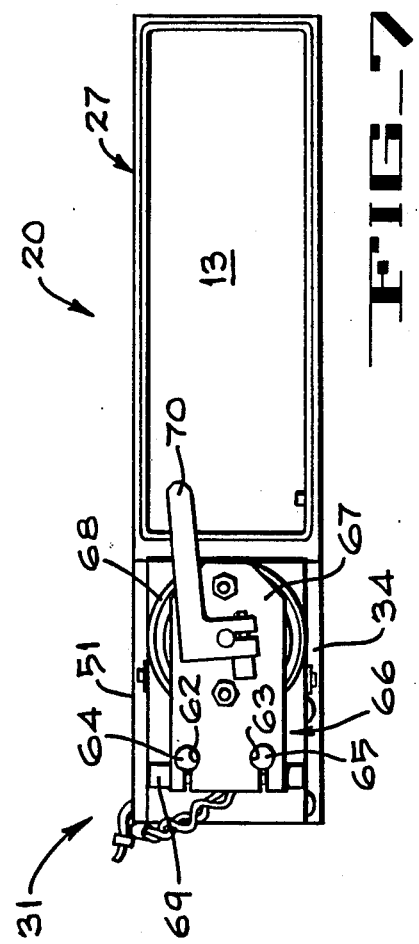

CASSETTE BIN STRUCTURE INCLUDING A BIN SECTION FOR LOADING AND UNLOADING CASSETTES

This is a continuation of co-pending application Ser. No. 851,069 filed on Apr. 11, 1986, now abandoned.

The present invention relates generally to cart spot players and in particular to the loading and unloading of cassettes with respect to a bin structure and recorder/reproducers of a cart spot player.

A cart (for "cartridge") spot player is a combination of a reproducing device such as a videotape recorder, and a cassette storage apparatus, which broadcasters use both to store magnetic tape cassettes which are used to record commercials, or spots, and to reproduce those spots on cue and in a specified order. Commercials, generally prepared by advertising agencies, are distributed to each station from which the advertisers have purchased air time. Each spot is recorded onto a separate cassette. The cassettes are loaded into a bin structure or tape library of the cart spot player for storage. The cart spot player is then programmed to run a sequence of spots. The failure of the cart spot player to perform the programmed sequence without error can cost the broadcasting station advertising dollars.

From the advent of the earliest cart spot player to the present, the bin structure or tape library has always been loaded manually regardless of the capacity or particular configuration of the machine.

The present invention provides a cart spot player having a cassette loading/unloading station for cassette input/output so mounted with respect to a bin structure that an operator may manually input cassettes into the loading/unloading station on one side for an associated cassette transfer assembly operating on the opposite side to mechanically output cassettes from the loading/unloading station for transport to the bin structure for archival storage, that same cassette transfer assembly operable to transfer the cassettes from archival storage to the tape transport for play or back to the cassette unloading/loading station for removal.

The advantages of such a configuration are noteworthy and substantial. The human operator is isolated from the cassette transfer assembly delivering cassettes to either archival storage or the tape transport. The tape library can be supplemented, updated, changed, while the player is in an operative mode. There is no need to shut down the player in order to change the library, update the library or supplement the library. Loading of the bin structure is automated and much faster than in known players. The increases in utility and productivity for such players are substantial when compared to the known structures.

Therefore it is desirable to devise a cart spot player which achieves substantially increased library capacity, having improved speed and accuracy in accessing that library, the accessing performed by a device of relative simplicity. Such cart spot player achieves its speed and accuracy with a construction dedicated to an automated cassette input which minimizes moving parts through the use of a stable and immovable tape library having a bin structure comprising an array of bins including a cassette loading/unloading station dedicated to cassette input/output, with the balance of the bin locations dedicated to archival storage. That bin structure interfaces with a cassette transfer assembly which is moveable between bin locations and an associated tape transport and which has the speed to load the bin structure by the swift and repeatable transport of a cassette from the loading station to archival storage or to the tape transport.

It is further desirable to devise the cart spot player to isolate the operator from the moveable cassette transfer assembly, while allowing him access to all operating components of the player.

Accordingly the present invention provides a cart spot player having a bin structure, a tape transport stack and a cassette loading/unloading station aligned in an ordered array and serviced at one side for cassette input/output by a moveable cassette transfer assembly. Input/output openings in the bin structure, the tape transport, and the cassette loading/unloading station receive the cassette input/output of the cassette transfer assembly. At the opposite side of the player are cassette input/output openings for the bin structure, the tape transports, and the cassette loading/unloading station. Such openings are provided for the manual input/output of cassettes by the operator. The above-described arrangement isolates the operator from the moveable cassette transfer assembly.

Additionally, the present invention provides a cart spot player having a relatively immovable, substantially planar bin structure having a cassette loading/unloading station having at least one bin dedicated to cassette input/output, and having the remaining bin locations within the bin structure dedicated to archival storage. A cassette transfer assembly operates between the input/output bins and the storage bins to swiftly effect the transfer of cassettes from the cassette input/output bins to the cassette storage bins and thereby automatically load the bin structure.

The bin structure includes a dedicated cassette loading/unloading station which includes a series of aligned input/output ports having opposite sides or openings for inputting or loading of a cassette at one side and outputting or unloading the cassette at the opposite side for transfer to an archival bin for storage. The cassette receiving ports are aligned in stacked relation and provided at one side of the bin structure, in one embodiment of the present invention.

The cassette receiving ports each have provided therewith cassette positioning devices which function to properly align the cassette within the cassette receiving port to assure engagement of the cassette by the cassette transfer assembly of the cart spot player. At the front of the cassette receiving port a pair of optical sensors senses the position of the cassette within the cassette receiving port. A solenoid-actuated flag is mounted at the rear of the cassette receiving port to act as a stop for cassettes inserted into the port, the flag to be displaced to permit the cassette transfer assembly to extract the cassette from the cassette receiving port for transport to a bin location for storage. An additional feature of the cassette positioning devices is a manual override cooperable with the flag to permit an operator who is stationed at the cassette loading/unloading station to also unload cassettes transferred from the bin structure to the cassette loading/unloading station by the cassette transfer assembly.

BRIEF DESCRIPTION OF THE DRAWINGS

A better understanding of the invention can be obtained by considering the following detailed description together with the accompanying drawings which illustrate a preferred embodiment of the present invention as used in a cart spot player having a cassette library or bin structure for storing magnetic tape cassettes in which:

FIG. 1 is a perspective view of the front of a cart spot player;

FIG. 2 is a perspective view of the rear of the cart spot player of FIG. 1;

FIG. 3 is a rear elevational view of a portion of the cart spot player of FIG. 2;

FIG. 4 is a perspective view of a pair of cassette receiving ports of the cassette loading/unloading station of the present invention, having a cassette positioned for insertion into a port and with the associated cassette bins shown in phantom;

FIG. 5 is a plan view of the cassette receiving port of FIG. 4;

FIG. 6 is a mirror image of a side elevation taken generally along the lines 6—6 of FIG. 5; and FIG. 7 is an end view of the cassette receiving port of FIG. 5.

DESCRIPTION OF THE PREFERRED EMBODIMENT

Referring first to FIGS. 1 to 3, there is shown a cart spot player 10. An integral part of the cart spot player 10 is a series of tape transports 11 mounted in stacked relation as tape transports 11a, b, c, d, having front input ports 11a', 11b', 11c' and 11d' for manual loading/unloading of cassettes 17, the tape transports 11 mounted next to a cassette library or bin structure 12 comprising a linear array of bins or bin locations 13, the bins 13 disposed along respective X and Y axes of the bin structure 12. The bin structure 12 is designed so that all of the bins 13 are generally the same size and are arranged in stacked relation, with each of the stacks 16 adjacent to and aligned with the remaining stacks 16, so that in the preferred embodiment the bin structure 12 presents an array of 8 stacks, each having 32 bins. The bin array may also be viewed as 32 horizontal rows and 8 vertical columns to present to the user an array of 256 bins of equal size in the bin structure 12. The front of the bin structure 12 is closed by a transparent glass door 15, which may be opened to provide access to the bin structure 12 for manual loading/unloading.

Each bin 13 includes side plates 13a of equal size, and top and bottom plates 13b which frame respective front and rear open faces 13' and 13''. The plates 13b are also of equal size; e.g., the bottom plate 13b of one bin 13 is the top plate 13b of the adjacent lower bin 13 in a stack 16. The longest dimension of the opening face 13'' of the bin 13 is defined by the length of top and bottom plates 13b. This dimension is slightly larger than the width of a cassette 17 to be loaded into the bin 13. The side plate 13a is solid. The bottom plate 13b is not solid but rather provides a frame which presents enough of a surface to support the cassette 17. When the cassette 17 is loaded into a bin 13, opposite ends of the cassette 17 will protrude from opposite ends of the bin 13, preferably by somewhat less than one inch at each end. In the preferred embodiment, a spring detent 14, as shown in FIG. 5, fastened at one edge of the top wall 13b, presents a notch 14a which extends downwardly at a midline of the bin 13 to engage the cassette 17 at mid-portion in a groove 17a provided at one edge thereof to provide a detent which locates and retains the cassette 17 within the bin 13, to facilitate both manual and automated input/output.

In the bin structure 12 as described above, the vast majority of bin locations are dedicated to archival storage. However, the cart spot player 10 of the present invention provides an automated cassette loading mechanism wherein the archival storage bins 13 are not loaded manually, from the front of the cart spot player 10, but rather are loaded automatically by a swiftly moving cassette transfer assembly 18 mounted on the rear of the cart spot player 10 for cooperative movement along X and Y axes defined by the bin structure 12. To control cassette input to the bin structure 12, the player 10 has provided within the bin structure 12 a cassette loading and unloading station or input/output assembly 19 having a front face 19a for a manual input-/output of cassettes 17 and a rear face 19a' accessible by the cassette transfer assembly 18 for the input/output of cassettes 17 for transport to, and insertion in, the bin structure 12 and the input/output ports 11a''', 11b''', 11c''' and 11d''' of the tape transports 11. In the preferred embodiment the cassette loading/unloading station 19 is provided at the left hand edge of the rear of the bin structure 12 and includes eight cassette receiving ports 20, but the number and location of such ports 20 may differ in other embodiments. It is implicit in any discussion of the cassette loading/unloading station 19, the bin structure 12 and the tape transports 11 that all receptacles described in connection therewith have a dual input/output function, e.g., the bin 13 which receives a cassette input from the loading station 19, may later provide a cassette output for delivery to the port 11'' of a tape transport 11 for input.

Each of the bins 13 has a specific location defined by X and Y coordinates and the cassette transfer assembly 18 is moveable in the X and Y directions to specifically locate the assembly 18 with respect to a particular bin location 13. The cassette transfer assembly 18 can randomly access all X-Y coordinates of both the bin structure 12 and the tape transport stack 11 and is moved in the X and Y directions by a cable, pulley and motor combination 22 for the X direction and a cable, pulley and motor combination 23 for the Y direction. All X,Y position control is controlled by a front control console 21 and a microprocessor or processing unit 24 for controlling system operations and functions. A more detailed description of the operation of the X-Y mechanism may be found in U.S. application Ser. No. 851,008, entitled "Bi-directional Transport Mechanism", filed Apr. 11, 1986, and assigned to the assignee of the present invention.

Mounted on the cassette transfer assembly 18 for X-Y movement with respect to the bin structure 12 and the tape transports 11, is a carriage mechanism 25. The carriage mechanism 25 is operable to engage a cassette 17 located in one of the bins 13 of the cassette loading-/unloading station 19, extract or output the cassette from that bin, load it into the carriage mechanism 25 for transport to one of the archival storage bins 13 of the bin structure 12 or to one of the tape transports 11 for loading. The above-described process is reversed for input to the loading/unloading station 19. A more detailed description of the structure and operation of the carriage mechanism 25, may be found in U.S. application Ser. No. 851,047, entitled "Carriage Mechanism for Automatic Extracting and Inserting of Cassettes", filed Apr. 11, 1986, and assigned to the assignee of the present invention.

Because the cassette loading/unloading station comprises a series of eight cassette receiving ports 20 mounted in stacked relation, each port 20 engaging a successive storage bin 13 of an edge stack 16 of the bin structure 12, it is only necessary to describe one of the cassette receiving ports 20 in detail. As shown in FIGS. 4-7, each port 20 includes a cassette receiving frame 27 having a main body portion 28 provided at the front input/output face 20a of the port 20, opposite sides 28a of the main body portion extending forwardly therefrom, with respective upper and lower ends 28b and 28c of the main body portion 28 extended to join the forward ends of respective sides 28a to form a forwardly extending cover portion 29 at opposite ends of the frame 27. At a forward edge of one side of the cover portion 29 an optical position sensor 30 is mounted top and bottom. The sensor 30 has two collectors 30a which are displaced from each other front and rear by somewhat more than one-fourth of an inch at the bottom and which face an emitter 30b at the top.

The frame 27 merely provides a sleeve for receiving the forward edge of the cassette 17 for manual input to the port 20, the fully inserted cassette being supported by the support plates 13a, b of the bin location 13.

Outboard of the storage bin 13 and the frame 27 is a support member 31 which has a side wall 31a connected to one side 28a of the main body portion 28 of the frame 27, by two screws 32, and extends rearwardly along the inwardly extending edge of the bin 13 and forwardly of the frame 27 to support a manual eject button 33. The support member 31 is a molded plastic part specifically designed for the present application. The member 31 is essentially a hollow box, with the basic structural member being a generally rectangular bottom plate 34. The bottom of plate 34 is modified at its forward end to accommodate a slight step 35 for an indicator 36 associated with the optical sensor 30. The bottom plate 34 also has a small rectangular cut-on portion 37 at a forward edge which is associated with the manual eject button 33. A trim plate 38, is provided at opposite ends of the stack of ports 20.

The side wall 31a is somewhat more than one and one-quarter inches high and essentially flat from the rear edge of the intersection 39 of side wall 31a and bottom plate 34 forward to a flange 40 which engages a front flange 41 provided on the frame 27. The flanges 40, 41 interact to provide a forward alignment joint 42 between the wall 31a and the frame 27 which complements a rear joint 44 provided between the wall 31a and the frame 27 by the screws 32.

A rear wall 46 extends along the respective rear edges of bottom wall 34 and side wall 31a. A rear support wall 48 is displaced inwardly from the rear wall 46, and generally parallel thereof, to provide strength and stability to the member 31.

A front wall 50 is stepped to accommodate the indicator 36 associated with the optical sensor 30 and the manual eject button 33.

A top wall 51 is generally C-shaped, with a central portion extending along the side wall 31a, between the rear wall 46 and the front wall 50, with a step occurring at the flange 40 adjacent the bin 13 to accommodate the manual eject button 33. A rear leg 52 of the top wall 51 overlies the rear wall 46 and the rear support wall 48 to define a chamber 53 therebetween. An upper leg 54 of the top wall 51 includes a cut out portion 56 aligned with the cut out portion 37, both associated with the manual eject button 33 and an upper extension 58 of the indicator 36 associated with the optical sensors 30. That portion of the bottom plate 34 exposed by the open portion of C-shaped top wall 51 supports circuit board 60, associated with the circuitry for the cassette receiving port 20.

A pair of aligned openings 62, 63 are provided in the rear walls 46 and 48 for receiving a pair of elongated shafts 64, 65. The openings are displaced vertically from each other to so displace the shafts 64, 65. At the outer end of the shafts 64, 65, a mounting bracket 66 is rigidly attached to the shafts 64, 65 as by fastener 69. The bracket 66 is a platelike member stepped at the shafts 64, 65 with a projection 67 generally parallel with the rear wall 46 extending toward the side wall 31a and the bin 13. Mounted on the projection 67 is a solenoid 68. Provided at the rear of the solenoid 68 is a flag or stop 70 activated by the solenoid 68. The flag 70 in FIG. 4 is aligned in interfering relation with the cassette receiving port 20.

As shown in FIG. 4, the flag 70 is positioned to engage the rear of the cassette 17 to stop it from further extension into the bin structure 12 and beyond a predetermined point as established by the fixed position of the flag 70. The flag actuating solenoid 68 also moves the flag 70 out of engagement with the cassette 17 to permit the carriage mechanism 25 to extract the cassette 17 from the receiving port 20 for transfer to a second bin location 13 within the bin structure 12 or to a transport input/output port 11''. The manual eject knob 33 is provided at the front of the cassette receiving port 20 to permit the manual output of a cassette 17 loaded into the port 20, since when fully loaded the outer face of the cassette 20 is flush with the edge of the main body portion 28 of the frame 27.

As seen in FIG. 5, the manual eject knob 33 is mounted on a shaft 72, which is supported for movement by an opening in the front wall 50 and a second opening in a support member 71 disposed slightly rearward of the rear of the frame 27, with the inner end of the shaft 72 engaging an inner end 73a of a pivotable member 73 having a pivot point 74 and, at an outer end 73b, engaging a holding bracket 76 connected between the shafts 64, 65 holding the flag 70. A head portion 77 of the knob 33 includes a side wall 78 which slides along the side wall 31a. Pushing the knob 33 in pushes the shaft 72 against the lower end 73a to pivot the member 73 around pivot point 74 to draw the shafts 64, 65 and the attached flag 70 inward to eject the cassette 17 out of the cassette receiving port 20 and toward the user. The side wall 78 of the knob 33 engages the flange 40 to provide an inward end stop for the knob 33. A spring 75 mounted on the shaft 64 between the bracket 66 and the rear wall 46 biases both the manual eject button 33 to its outwardly extended position and the flag 70 to its fully extended position. A stop 79, mounted on the shaft 72, engages the member 71 to limit outward movement of the shaft 72 and its associated manual eject button 33.

In operation the cassette loading/unloading station 19 functions as follows. The cassette receiving ports 20 are mounted in stacked relation to engage a stack of input bins 13 provided on bin structure 12. In the preferred embodiment a stack of eight cassette receiving ports 20 form the cassette loading/unloading station 19 provided at the edge of the bin stack 16. In the preferred embodiment the human operator is disposed at one side of the cart spot player 10 and can manually access the tape transports 11, the bin structure 12 and the cassette loading/unloading station 19 for input/output and the cassette transfer assembly 18 is disposed at the side of the cart spot player 10 opposite the operator and can automatically access the tape transports 11, the bin structure 12, and the cassette loading/unloading station 19 for input/output. In one example, the operator inputs a cassette 17 into a cassette receiving port 20, pushing the cassette 17 inward until it engages the flag 70 of the cassette receiving port 20. During insertion, the cassette 17 interferences with the output of the optical sensor 30, and the indicator 36 indicates the presence of a cassette in the port 20. When the cassette 17 passes beyond the first collector 30a to a position between the two collectors 30a, the cassette 17 is positioned for extraction, and the sensor 30 signals the system control logic associated with the processing unit 24 to activate the cassette transfer assembly 18 to extract the cassette 17 out of the port 20, load it into the cassette transfer assembly 18 and transport it to a storage bin 13 for insertion. The sensor 30 could also indicate when the cassette transfer assembly 18 has loaded a cassette into the port 20, if the assembly 18 places the cassette 17 far enough into the port 20 to cover both collectors 30a. The above-described includes the activation of the solenoid 68 to raise the flag 70 out of the way as the assembly 18 approaches the port 20 to extract the cassette 17. Both the manual loading of the operator and the automated unloading of the cassette transfer assembly 18 is continuous to automatically load all bin locations 13 of bin structure 12. Flag 70 also prevents the operator from pushing the cassette 17 too far into the bin 13 so that the cassette 17 is prevented from being pushed into interfering relationship with the sweep of the cassette transfer assembly 18.

Having described the preferred embodiment of the invention, it should be understood that such invention is not limited to the above description and the changes and modifications may be made therein without affecting the scope and contents thereof. Such scope is to be confined only to the appended claims.

What is claimed is:

1. In a cart spot player having a bin structure for storing cassettes, each bin of the bin structure open at front and rear sides, the bin structure having a first bin section for the loading and unloading of cassettes and a second bin section for cassette storage, a tape transport for receiving cassettes, and a cassette transfer assembly for transferring cassettes from the first bin section to the second bin section for storage, including:

at least one cassette load/unload bin in the first bin section; and a stop member mounted at the rear of the cassette load/unload bin, the stop member including first stop positioning means for positioning the stop member at the rear of the cassette load/unload bin to facilitate cassette loading and unloading, for locating the stop member in a first position to engage and position a cassette at a fully loaded position of the load/unload bin, the cassette so positioned as to enable the cassette transfer assembly to transfer the cassette from the load/unload bin to a storage bin and, for moving the stop member to a second position, out of engagement with said positioned cassette in the cassette load/unload bin, to enable the cassette transfer assembly to extract the cassette from the rear of the bin; and the stop member including second stop positioning means moveable, when the stop member is in an engaged position with respect to a cassette positioned in the bin, to urge the stop member and the cassette in engagement therewith forward to a predetermined position which enables an operator to extract the cassette from the front of the bin.

2. A bin structure as claimed in claim 1 wherein means for sensing the position of the cassette within the cassette load/unload bin is provided in the bin and comprises a sensor having portions thereof mounted at a front edge of the cassette load/unload bin and spaced front to rear the with respect to the cassette load/unload bin to sense at least one position of the cassette in the bin, and which, upon the insertion of a cassette into the bin, assures engagement of the cassette by the cassette transfer assembly.

3. A bin structure as claimed in claim 2 wherein the positioning of the front edge of the cassette between the spaced portions at the sensor, places the cassette in position in the bin for extraction from the rear of the bin by the cassette transfer assembly.

4. A cart spot player as claimed in claim 1 wherein the first stop positioning means includes a solenoid for moving the stop member from the first position to the second position.

5. A cart spot player as claimed in claim 1 wherein in the second stop positioning means includes a pivotable mechanism engaged by a manual eject button which mechanism, when activated, pivots a member to draw the stop member forward to urge the cassette out of the front of the cassette load/unload bin.

6. In a cart sot player, a bin structure for storage of magnetic tape cassettes, each bin of the bin structure open at a front and at an opposite, rear side, at least one tape transport having both a front access opening and a rear access opening, each opening capable of receiving a cassette for play, and a cassette load/unload station open at a front and at an opposite, rear side; the bin structure, the tape transport, and the cassette loading-/unloading station arranged in an ordered array for mutual access to both the front and rear sides thereof;

a cassette transfer assembly moveably mounted on a rear side of the player to access rear openings of the bin structure, the tape transport and the cassette loading/unloading station;

at the rear side of the cart spot player, the rear openings provided in the bin structure, the tape transport and the cassette load/unload station enabling a mechanical loading/unloading of cassettes by the transfer assembly, the cassette transfer assembly mounted on said rear side and moveable to transfer the cassettes to and from the cassette load/unload station, the bin structures and the tape transport;

at the front side of the cart spot player, the front openings provided in the bin structure, the tape transport and the cassette load/unload station enabling the manual loading/unloading of cassettes into the cassette load/unload station, the bin structure and the tape transport;

the cart spot player being loaded and unloaded on the rear side by the moveable cassette transfer assembly and the front side manually to isolate the operator from the movable cassette transfer assembly.

7. In a bin structure for storing cassettes, a cassette load/unload bin section having at least one bin for the loading and unloading of cassettes, the bin open at front and rear sides, a stop member assembly mounted on the cassette load/unload bin section, including;

a cassette load/unload bin of the cassette load/unload bin section;

a stop member mounted at the rear of the cassette load/unload bin;

first stop positioning means for positioning the stop member at the rear of the bin to facilitate cassette loading and unloading; in a first position, in engagement with a cassette to position said cassette at a fully loaded position of the cassette load/unload bin and, in a second position, out of engagement with said positioned cassette in the cassette load-/unload bin; and second stop positioning means moveable, when the stop member is in an engaged position with respect to a cassette in the cassette load/unload bin, for urging the stop member forward to a predetermined position which enables an operator to extract the cassette from the front of the cassette.

8. In the bin structure for storing cassettes as claimed in claim 7 wherein the first stop positioning means includes a solenoid for moving the stop member from a cassette engaging position to the cassette non-engaging position.

9. In the bin structure for storing cassettes as claimed in claim 7, wherein the second stop positioning means includes a pivotable mechanism engaged by of a manual eject button which mechanism, when activated, pivots a member to draw the stop member forward to urge the cassette out of the front of the cassette load/unload bin.

* * * * *